United States Patent
Yang et al.

(10) Patent No.: US 9,578,342 B2
(45) Date of Patent: Feb. 21, 2017

(54) RATE CONTROL ALGORITHM FOR SCALABLE VIDEO ENCODING WITH DISPOSABLE P-FRAMES

(71) Applicants: Kyeong Ho Yang, Freehold, NJ (US); Sangseok Park, Flower Mound, TX (US)

(72) Inventors: Kyeong Ho Yang, Freehold, NJ (US); Sangseok Park, Flower Mound, TX (US)

(73) Assignee: Dialogic Corporation, Montreal (CA)

( * ) Notice: Subject to any disclaimer, the term of this patent is extended or adjusted under 35 U.S.C. 154(b) by 546 days.

(21) Appl. No.: 14/087,264

(22) Filed: Nov. 22, 2013

(65) Prior Publication Data
US 2014/0376617 A1 Dec. 25, 2014

Related U.S. Application Data

(60) Provisional application No. 61/838,590, filed on Jun. 24, 2013.

(51) Int. Cl.
*H04N 7/24* (2011.01)
*H04N 11/02* (2006.01)
(Continued)

(52) U.S. Cl.
CPC .......... *H04N 19/187* (2014.11); *H04N 19/124* (2014.11); *H04N 19/132* (2014.11);
(Continued)

(58) Field of Classification Search
USPC ........................................................ 375/240
See application file for complete search history.

(56) References Cited

U.S. PATENT DOCUMENTS

7,072,366 B2 * 7/2006 Parkkinen ............... G10L 19/24
348/401.1
7,082,164 B2 * 7/2006 Chaddha ................... G06T 9/40
375/240.12

(Continued)

OTHER PUBLICATIONS

Thomas Wiegand et al., Overview of the H.264/AVC Video Coding Standard, IEEE Transactions on Circuits and Systems for Video Technology, vol. 13, No. 7, Jul. 2003.

*Primary Examiner* — Jeremaiah C Hallenbeck-Huber
*Assistant Examiner* — Susan E Hodges
(74) *Attorney, Agent, or Firm* — Chapin IP Law, LLC (57) ABSTRACT

Systems and methods of performing rate control in scalable video encoders that can be used to provide videoconferencing, announcements, and live video streaming to multiple participant devices having diverse bandwidths, resolutions, and/or other device characteristics. The systems and methods can accommodate different target bit rates of the multiple participant devices by operating on scalable video bitstreams in a multi-layer video format, including a base layer having one or more reference video frames, and an enhancement layer having one or more disposable non-reference, predictive video frames. By adjusting the number of disposable non-reference, predictive video frames in the enhancement layer, as well as quantization parameters for the respective base and enhancement layers, the disclosed systems and methods can accommodate the different target bit rates for the respective participant devices, while enhancing the spatial and/or temporal qualities of the base and enhancement layers in the respective video bitstreams.

23 Claims, 6 Drawing Sheets

(51) Int. Cl.
*H04N 19/187* (2014.01)
*H04N 21/2343* (2011.01)
*H04N 7/12* (2006.01)
*H04N 19/124* (2014.01)
*H04N 19/147* (2014.01)
*H04N 19/30* (2014.01)
*H04N 19/132* (2014.01)
*H04N 19/152* (2014.01)
*H04N 19/162* (2014.01)

(52) U.S. Cl.
CPC ......... *H04N 19/147* (2014.11); *H04N 19/152* (2014.11); *H04N 19/162* (2014.11); *H04N 19/30* (2014.11)

(56) References Cited

U.S. PATENT DOCUMENTS

| | | | |
|---|---|---|---|
| 2007/0074266 A1* | 3/2007 | Raveendran | H04N 5/144 725/135 |
| 2007/0296854 A1* | 12/2007 | Berkey | H04N 19/172 348/412.1 |
| 2008/0144723 A1* | 6/2008 | Chen | H04N 19/15 375/240.26 |
| 2008/0181302 A1* | 7/2008 | Demircin | H04N 19/152 375/240.06 |
| 2008/0211901 A1* | 9/2008 | Civanlar | H04N 7/152 348/14.09 |

* cited by examiner

Difference in quantization parameter, dQP, for base layer and enhancement layer

*FIG. 4*

Dynamic change of frequency of disposable P-frames

*FIG. 5*

Change in quantization parameter (QP) for each video frame

*FIG. 6*

RATE CONTROL ALGORITHM FOR SCALABLE VIDEO ENCODING WITH DISPOSABLE P-FRAMES

CROSS REFERENCE TO RELATED APPLICATIONS

This application claims benefit of the priority, and incorporates by reference the entirety of U.S. Provisional Patent Application No. 61/838,590 filed Jun. 24, 2013 entitled A RATE CONTROL ALGORITHM FOR SCALABLE VIDEO ENCODING WITH DISPOSABLE P-FRAMES.

TECHNICAL FIELD

The present application relates generally to systems and methods of performing rate control in video encoders, and more specifically to systems and methods of performing rate control in scalable video encoders for use in providing videoconferencing, announcements, and/or live video streaming to multiple participant devices having diverse bandwidths, resolutions, and/or other device characteristics.

BACKGROUND

In recent years, videoconferencing over the Internet and/or wireless networks has gained increased popularity. In conventional videoconferencing systems, multipoint control units (MCUs) have been employed in conjunction with the Internet and/or wireless networks to enable collaboration among groups of participant devices in videoconferences by performing various functions such as mixing, synchronizing, and/or transcoding video and/or audio bitstreams generated by the respective participant devices.

However, maintaining acceptable levels of video quality for such participant devices engaged in videoconferencing over the Internet and/or wireless networks can be problematic because the participant devices can often have different bandwidth, resolution, and/or other device requirements. To obtain acceptable levels of video quality for such participant devices, particularly those that operate at different bandwidths, MCUs employed in videoconferencing may find it necessary to encode video and/or audio bitstreams generated by one or more of the respective participant devices multiple times, thereby increasing the processing requirements of the video conferencing system.

Some conventional videoconferencing systems have employed scalable video coding (SVC) techniques (i.e., the Annex G extension of the H.264/MPEG-4 Advanced Video Coding (AVC) video compression standard) to effectively share an encoder in an MCU among multiple participant devices, allowing the shared encoder to generate video bitstreams that cover multiple bit rates, or a range of bit rates. However, such SVC techniques can be complicated and costly to implement, and, for at least these reasons, have not been widely deployed to date in videoconferencing systems.

SUMMARY

In accordance with the present application, systems and methods of performing rate control in scalable video encoders are disclosed that can be used to provide videoconferencing, announcements, and/or live video streaming to multiple participant devices having diverse bandwidths, resolutions, and/or other device characteristics. The disclosed systems and methods can accommodate different target bit rates of the multiple participant devices by operating on scalable video bitstreams in a multi-layer video format, including a base layer having one or more reference video frames, and an enhancement layer having one or more disposable non-reference, predictive video frames.

In one aspect, an exemplary system can include an endpoint device communicably coupleable to a plurality of participant devices by a communications network. In an exemplary aspect, the endpoint device can be implemented as a media server operative to enable video conferencing activities among the participant devices, e.g., by decoding, synchronizing, mixing, and/or encoding video and/or audio bitstreams generated by the respective participant devices. The endpoint device includes an exemplary scalable video encoder having an exemplary rate control component that employs non-reference, predictive video frames (also referred to herein interchangeably as the "non-reference P-frames", "disposable P-frames", or "D-frames") for accommodating the different target bit rates of the respective participant devices. The rate control component can include a plurality of functional components, including, but not limited to, a disposable P-frame generation sub-component, a first quantization parameter (QP) adjustment sub-component, a disposable P-frame adjustment sub-component, a maximum target bit rate adjustment sub-component, and a second QP adjustment sub-component.

In an exemplary mode of operation, the scalable video encoder can generate a scalable video bitstream from a source video sequence. The scalable video bitstream includes a base layer and at least one enhancement layer. The base layer can include a plurality of reference, predictive video frames (also referred to herein interchangeably as the "reference P-frames" or "P-frames"), and the enhancement layer can include one or more disposable P-frames. Based at least on a target bit rate for one of the plurality of participant devices, one or more of the disposable P-frames in the enhancement layer of the scalable video bitstream can be dropped prior to transmission of the scalable video bitstream to the respective participant device at the target bit rate.

In this exemplary mode of operation, to increase the accuracy and/or stability of rate control for the scalable video bitstream, the disposable P-frame generation sub-component can determine whether a current video frame in the source video sequence is indicative of a scene change. If the current video frame is indicative of a scene change, then the disposable P-frame generation sub-component can encode the current video frame as an intra-coded type of video frame, or a reference predictive video frame. Further, to obtain a QP for the enhancement layer that is larger than the QP for the base layer, the first QP adjustment sub-component can dynamically adjust the differences between QPs for the respective base and enhancement layers based at least on a current bit usage in the enhancement layer. Moreover, to control the bit rate more effectively, the disposable P-frame adjustment sub-component can adjust the number of disposable P-frames in the enhancement layer by adjusting a target bit rate of the enhancement layer based at least on a current bit usage in the base layer, as well as a buffer status of the base layer.

To improve the temporal quality of the base layer, the maximum target bit rate adjustment sub-component can perform video content analysis based at least on the QPs for the respective base and enhancement layers. In the event the current bit usage in the base layer allows for an increase in the number of video frames encoded as P-frames at a predetermined video quality level, the maximum target bit rate adjustment sub-component can reduce the maximum target bit rate, thereby allowing the target bit rate for the enhancement layer to be reduced. Such a reduction of the target bit rate for the enhancement layer can, in turn, reduce the number of video frames to be encoded as D-frames in the enhancement layer, as well as increase the number of video frames to be encoded as P-frames in the base layer. In this way, the temporal quality of the base layer bitstream can be improved without substantially degrading the video quality of the enhancement layer bitstream.

In addition, to further increase the stability of rate control for the scalable video bitstream, the second QP adjustment sub-component can, upon detection of a scene change, adjust the QP for at least the first disposable P-frame in the enhancement layer based at least on the QP for the base layer.

By adjusting the number of disposable P-frames in the enhancement layer, as well as the QPs for the respective base and enhancement layers, the disclosed systems and methods can accommodate the different target bit rates for the respective participant devices, while enhancing the temporal and/or spatial qualities of the base and enhancement layers in the respective scalable video bitstreams.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings:

FIG. 2b is a block diagram of the rate control component of FIG. 2a;

DETAILED DESCRIPTION

The disclosure of U.S. Provisional Patent Application No. 61/838,590 filed Jun. 24, 2013 entitled A RATE CONTROL ALGORITHM FOR SCALABLE VIDEO ENCODING WITH DISPOSABLE P-FRAMES is hereby incorporated herein by reference in its entirety.

Systems and methods of performing rate control in scalable video encoders are disclosed that can be used to provide videoconferencing, announcements, and live video streaming to multiple participant devices having diverse bandwidths, resolutions, and/or other device characteristics. The disclosed systems and methods can accommodate different target bit rates of the multiple participant devices by operating on scalable video bitstreams in a multi-layer video format, including a base layer having one or more intra-coded frames and one or more reference, predictive video frames (also referred to herein interchangeably as the "reference P-frames" or "P-frames"), and an enhancement layer having one or more non-reference, predictive video frames (also referred to herein interchangeably as the "non-reference P-frames", "disposable P-frames", or "D-frames"). By adjusting the number of disposable P-frames in the enhancement layer, as well as quantization parameters for the respective base and enhancement layers, the disclosed systems and methods can accommodate the different target bit rates for the respective participant devices, while enhancing the spatial and/or temporal qualities of the base and enhancement layers in the respective video bitstreams.

Figure 1:
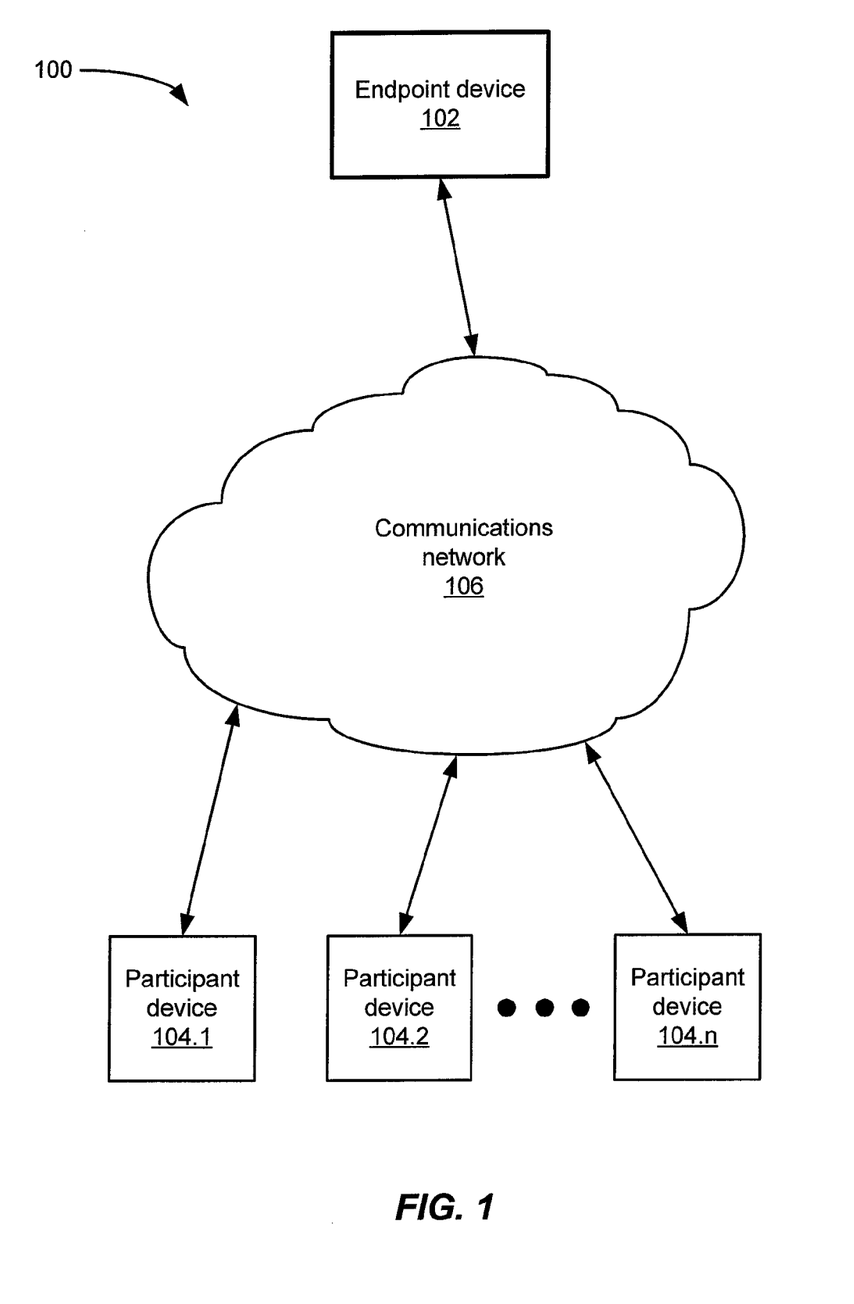
FIG. 1 is a block diagram of an exemplary communications system that includes an exemplary endpoint device communicably coupled, by an exemplary communications network, to a plurality of exemplary participant devices having diverse bandwidths, resolutions, and/or other device characteristics, in accordance with the present application.

FIG. 1 depicts an exemplary communications system 100 that includes an illustrative embodiment of an exemplary endpoint device 102, in accordance with the present application. For example, the endpoint device 102 can be embodied as a multipoint control unit (MCU), an announcement server, or any other suitable endpoint device. As shown in FIG. 1, the endpoint device 102 is communicably coupled to a plurality of participant devices 104.1-104.$n$ by a communications network 106, which may be a wired and/or wireless network such as the Internet or any other suitable network. In one exemplary embodiment, the endpoint device 102 is implemented as a media server, and is operative to enable video conferencing activities among the participant devices 104.1-104.$n$, e.g., by decoding, synchronizing, mixing, and/or encoding video and/or audio bitstreams generated by the respective participant devices 104.1-104.$n$, which devices may include one or more desktop computers, laptop computers, tablet computers, smartphones, or any other suitable computers and/or computerized devices.

Figure 2A:
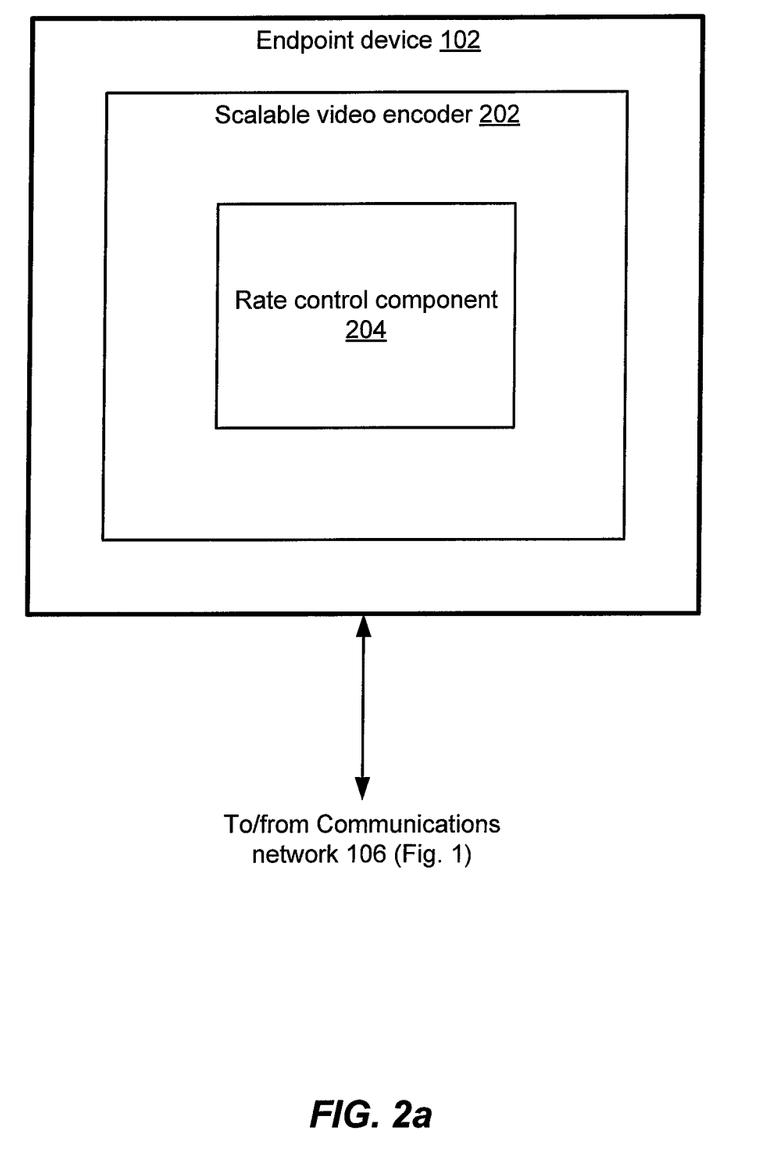
FIG. 2a is a block diagram of the endpoint device of FIG. 1, including an exemplary scalable video encoder having an exemplary rate control component for accommodating different target bit rates of the plurality of participant devices of FIG. 1.
Figure 2B:
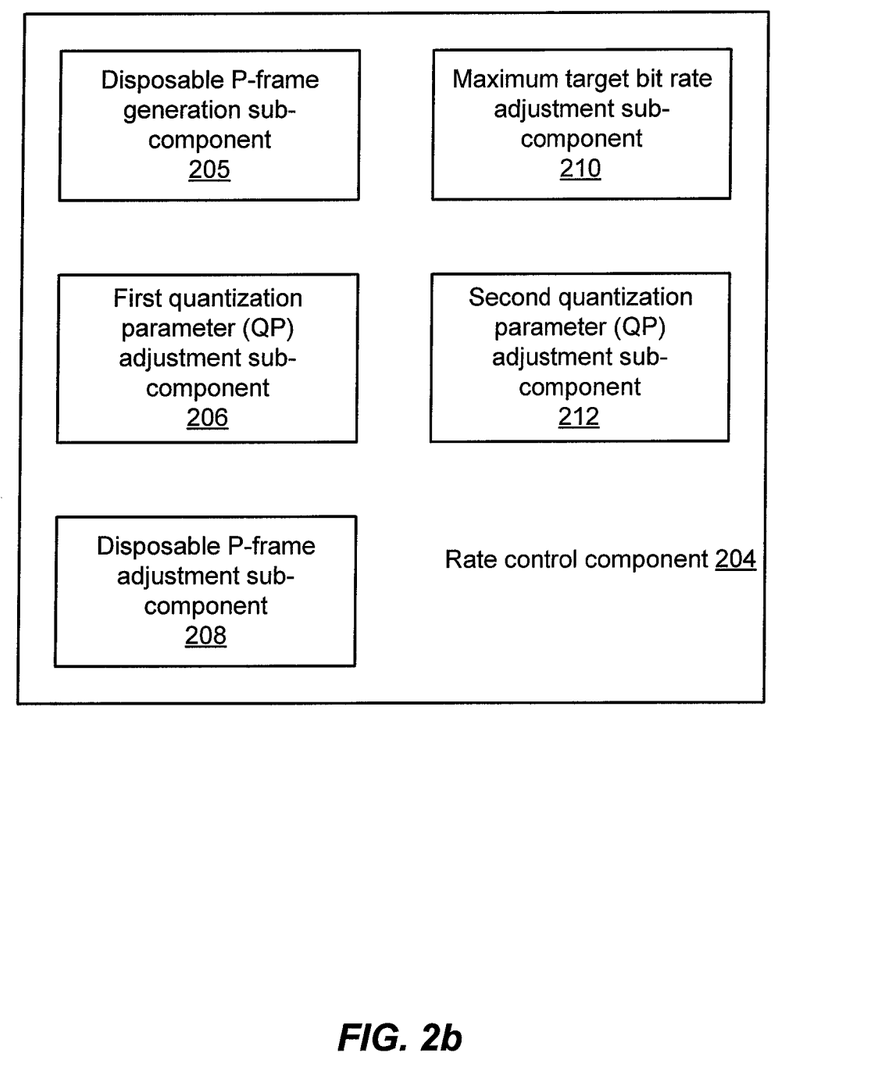

FIG. 2a depicts the endpoint device 102 of FIG. 1 as including an exemplary scalable video encoder 202 having an exemplary rate control component 204 for accommodating the different target bit rates of the plurality of participant devices 104.1-104.$n$. As shown in FIG. 2b, the rate control component 204 includes a disposable P-frame generation sub-component 205, a first quantization parameter (QP) adjustment sub-component 206, a disposable P-frame adjustment sub-component 208, a maximum target bit rate adjustment sub-component 210, and a second QP adjustment sub-component 212. As further described herein, the first QP adjustment sub-component 206 is operative to adjust the quantization parameters (QPs) for the respective base and enhancement layers of a scalable video bitstream, and the second QP adjustment sub-component 212 is operative to adjust the QP for at least one disposable P-frame in the enhancement layer.

The operation of the endpoint device 102 for performing rate control within the communications system 100 of FIG. 1 will be further described with reference to the following discussion regarding the generation of an exemplary scalable video bitstream in a multi-layer video format. In the following discussion, it is assumed that video frames included in the scalable video bitstream conform to the H.264 Advanced Video Coding (AVC) video format (also referred to herein as the "H.264 standard"). It is noted, however, that the video frames in the scalable video bitstream may alternatively conform to the ISO/IEC 23008-2 and ITU-T Recommendation H.265 video format (also referred to as the "high efficiency video coding standard" or "HEVC standard"), or any other suitable video format.

The scalable video encoder 202 (see FIG. 2a) within the endpoint device 102 (see FIG. 1) is configured to receive a source video sequence that may be formed by video streams from one or more of the plurality of participant devices 104.1-104.n, and to generate a scalable video bitstream, including a base layer and at least one enhancement layer, for the source video sequence. It is noted that, in a multi-layer video format, the base layer generally represents a source video sequence at least at some minimum level of spatial and/or temporal quality, and the enhancement layer generally includes video frame information for enhancing the spatial and/or temporal quality of the base layer.

Figure 3:
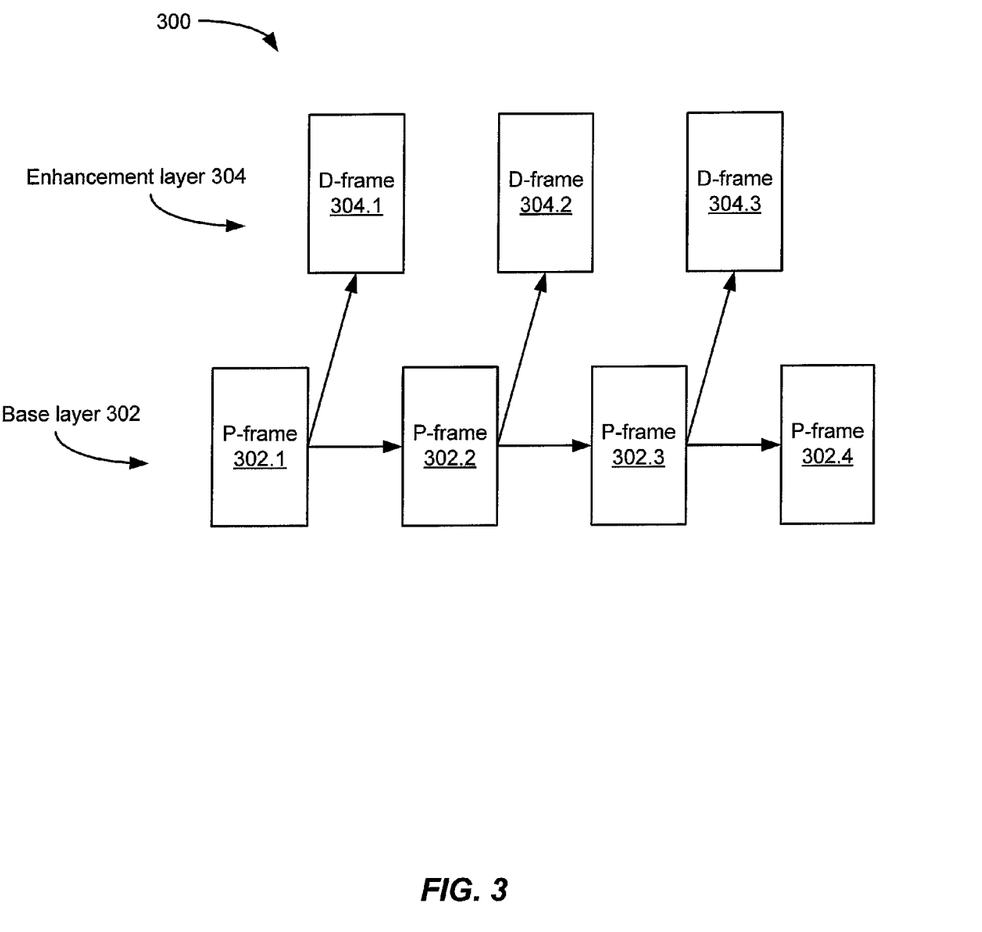
FIG. 3 is a block diagram of an exemplary scalable video bitstream in a multi-layer video format, the scalable video bitstream including an exemplary base layer having one or more reference video frames, and an exemplary enhancement layer having one or more disposable non-reference, predictive video frames.

FIG. 3 depicts an exemplary scalable video bitstream 300 that may be generated by the scalable video encoder 202 for a given source video sequence, including a base layer 302 and an enhancement layer 304. As shown in FIG. 3, the base layer 302 includes one or more reference, predictive video frames, such as exemplary reference, predictive video frames 302.1, 302.2, 302.3, 302.4, each of which corresponds to a P-frame. Further, the enhancement layer 304 includes one or more non-reference, predictive video frames, such as exemplary non-reference, predictive video frames 304.1, 304.2, 304.3, each of which corresponds to a D-frame. In the scalable video bitstream 300, the single D-frame 304.1 is located between the P-frames 302.1, 302.2, the single D-frame 304.2 is located between the P-frames 302.2, 302.3, and the single D-frame 304.3 is located between the P-frames 302.3, 302.4. It is noted that the base layer 302, as well as the enhancement layer 304, may each include any other suitable number of video frames, with such number being greater or less than what is depicted for each in FIG. 3.

Reference P-frames (the "P-frames") are generally used to decode one or more other video frames in a video bitstream, and therefore are generally not dropped during transmission or recording of the video bitstream. It is noted, however, that the H.264 standard does not require all of the P-frames in a video bitstream to function as reference video frames, but allows at least some of the P-frames in the video bitstream to be used as non-reference video frames. Such non-reference P-frames (the "D-frames") are not used to decode any other video frames in the video bitstream, and can therefore be dropped, or otherwise disposed of, during transmission or recording of the video bitstream, without significant degradation of a user's quality of experience (QoE). In the H.264 AVC video format, such disposable P-frames can be identified by observing that the bit, nal_ref_idc, in the header of a network abstraction layer (NAL) unit is set to "0", and that the field, frame_num, in a corresponding slice header is not increased.

The number of D-frames in the enhancement layer between successive P-frames in the base layer (also referred to herein as "$R_D$") can be set to any suitable value, including 0.25, 0.5, 1.0, 2.0, or 3.0, resulting in the following exemplary video frame sequences:

$R_D$ = 0.25,  I P P P D P P P P D . . .
$R_D$ = 0.5,   I P D P P D P P D . . .
$R_D$ = 1.0,   I D P D P D P . . .
$R_D$ = 2.0,   I D D P D D P D D P . . .
$R_D$ = 3.0,   I D D D P D D D P D D D P . . . , in which "P" denotes a reference P-frame, "D" denotes a disposable, non-reference P-frame, and "I" denotes an intra-coded type of video frame (also referred to herein as an/the "I-frame"). It is noted that the inclusion of increased numbers of D-frames from the enhancement layer between successive P-frames in the base layer can make the base layer appear to be jerky in an output video bitstream, and can also degrade the accuracy of temporal prediction using the reference P-frames in the base layer. For this reason, the maximum number of D-frames to be located between successive P-frames in the base layer can be set to a predetermined maximum value (also referred to herein as "$R_{DMAX}$"), such as "3" or any other suitable value.

With reference to FIGS. 1-3, the scalable video encoder 202 within the endpoint device 102 can selectively drop some or all of the D-frames 304.1-304.3 in the enhancement layer 304 of the video bitstream 300 to obtain the target bit rate for each of the participant devices 104.1-104.n. For example, the target bit rate for each participant device can be determined based at least on a corresponding channel bandwidth, the decoding capability of the participant device, the user's service agreement, etc.

It is noted that FIG. 3 depicts the resulting structure of the scalable video bitstream 300 for $R_D$ equal to 1.0. Further, the arrows (→) in FIG. 3 indicate the direction of temporal prediction. As shown in FIG. 3, all of the video frames in the base layer 302 and the enhancement layer 304 use reference P-frames from the base layer 302 for temporal prediction. Because the number of reference P-frames in the base layer 302 remains the same whether or not some or all of the D-frames in the enhancement layer 304 are dropped, any suitable number of D-frames in the enhancement layer 304 can be dropped to accommodate the different target bit rates of the participant devices 104.1-104.n.

An exemplary method of generating D-frames for inclusion in the enhancement layer of a scalable video bitstream, which can be performed by the disposable P-frame generation sub-component 205 (see FIG. 2b), is described herein with reference to the following pseudo code example:

```
if (N_D < 1.0 or scene change)
{
    frame_type = normal frame ( I-frame or P-frame)
    N_D += R_D
}
else
{
    frame_type = D
    N_D -= 1.0
}
``` in which "$R_D$" is the target number of D-frames, and "$N_D$" is a variable that tracks the number of D-frames and is initialized to "0". As indicated in the pseudo code example above, when a current video frame is determined as a scene change, that video frame can be encoded as an I-frame or a P-frame to increase the accuracy and stability of rate control for the scalable video bitstream.

It is noted that, as the number of D-frames in the enhancement layer increases, coding efficiency can become degraded due to the increased temporal distance to the reference P-frames in the base layer. Further, complex video sequences with high degrees of motion tend to require more D-frames than less complex video sequences in order to support the same target bit rate range. As a result, there can be a tradeoff between spatial/temporal quality and scalability. Moreover, it can be challenging to generate a scalable video bitstream that provides good spatial quality (e.g., signal-to-noise ratio (SNR)) and good temporal quality (e.g., the frame rate) for both the base and enhancement layers, while still meeting a target bit rate range.

The rate control component 204 (see FIGS. 2a and 2b) is further described below with reference to an exemplary rate control algorithm that can provide improved spatial/temporal quality at substantially any desired bit rate within a given target bit rate range. The rate control component 204 can execute the exemplary rate control algorithm to perform rate control with reference to both the base layer and the enhancement layer of a scalable video bitstream. It is noted that rate control with reference to just the base layer can be performed using any suitable rate control algorithm, such as any suitable rate control algorithm conforming to the H.264 standard.

In the exemplary rate control algorithm, two parameters are employed to define the target bit rate range, namely, the maximum target bit rate, $R_{target\_max}$, and the minimum target bit rate, $R_{target\_min}$. The target bit rate of the base layer, "$R_{BL,\ target}$", is the same as the minimum target bit rate, $R_{target\_min}$, and the target bit rate of the enhancement layer, "$R_{EL,\ target}$", can be obtained by subtracting the minimum target bit rate, $R_{target\_min}$, from the maximum target bit rate, $R_{target\_max}$, as follows:

$$R_{BL,\ target} = R_{target\_min}$$

$$R_{EL,\ target} = R_{target\_max} - R_{target\_min}$$

The exemplary rate control algorithm further employs the parameter, $R_{DMAX}$, which, as noted herein, is the maximum number of D-frames from the enhancement layer to be located between successive P-frames in the base layer.

In the exemplary rate control algorithm, it is desirable to use a larger quantization parameter (QP) for the D-frames in the enhancement layer than for the P-frames and I-frames in the base layer because, as noted herein, the D-frames are not used as reference frames for any other video frames in the video bitstream. Within the rate control component 204, the first QP adjustment sub-component 206 (see FIG. 2b) is operative to dynamically adjust the resulting difference in the quantization parameters (such difference in the quantization parameters also referred to herein as "dQP"), depending on the bits available in the enhancement layer. The current bit rate for the enhancement layer, "$R_{EL}$", can be obtained from the time window for the last "N" D-frames to take into account local statistics. For example, N can be set to "12" or any other suitable value. The QP for a D-frame is then obtained by adding the average of the QP differences, "$dQP_{avg}$", to the average QP for the video frames in the base layer, "$QP_{avg\_BL}$".

An exemplary method of adjusting the average of the QP differences, $dQP_{avg}$, to meet the target bit rate for the enhancement layer, "$R_{EL,\ target}$", which can be performed by the first QP adjustment sub-component 206 (see FIG. 2b) independently of rate control in the base layer, is described herein with reference to the following pseudo code example:

| | |
|---|---|
| "$R_{BL,\ estimated}$": | Estimated bit rate for the base layer ("BL") |
| "$R_{EL,\ estimated}$": | Estimated bit rate for the enhancement layer ("EL") |
| "$QP_{frame}$": | QP for the video frame |
| "$QP_{avg\_BL}$": | Average of QP for the video frame in the BL |
| "$QP_{avg\_EL}$": | Average of QP for the video frame in the EL |

$R_{EL,\ estimated} = R_{EL}$
if ($R_{EL} < 0.95 * R_{EL,\ target}$)
{
    while ($R_{EL} < 0.95 * R_{EL,\ target}$)
    {
        $R_{EL,\ estimated}$ *= 1.11
        dQP--;
        $R_{EL} = R_{EL} * 0.2 + 0.8 * R_{EL,\ estimated}$
    }
}
else if ($R_{EL} > 1.05 * R_{EL,\ target}$)
{
    while ($R_{EL} > 1.05 * R_{EL,\ target}$)
    {
        $R_{EL,\ estimated}$ *= 0.90;
        dQP++;
        $R_{EL} = R_{EL} * 0.2 + 0.8 * R_{EL,\ estimated}$;
    }
}
$dQP_{avg} = dQP_{avg} * 0.6 + 0.4 * dQP$
$QP_{frame} = QP_{avg\_BL} + dQP_{avg}$ With further regard to the exemplary rate control algorithm, the target number of D-frames, $R_D$, can be adjusted to control the bit rate. While more frequent adjustments of $dQP_{avg}$ and $R_D$ may increase the accuracy of rate control, less frequent adjustments of $dQP_{avg}$ and $R_D$ can provide smoother and more stable video quality, so long as the target bit rate and other requirements, such as buffer size, are met. It can also be advantageous to adjust $R_D$ such that its value is decreased more quickly than it is increased.

In one exemplary embodiment, the target number of D-frames, $R_D$, is adjusted to the values, 0, 0.25, 0.5, 1, 2, 3 ($R_{DMAX}=3$), which correspond to a plurality of "dp_indexes", 0, 1, 2, 3, 4, 5, respectively. In the exemplary rate control algorithm, an under-consumption of bits in the enhancement layer requires an increase in the dp_index, while an over-consumption of bits in the enhancement layer requires a decrease in the dp_index. Such levels of bit consumption can be determined from $dQP_{avg}$ and dp_index. Further, a higher $dQP_{avg}$ value indicates that the enhancement layer consumes a higher number of bits, and therefore fewer D-frames should be used, e.g., the dp_index should be decreased. To increase the accuracy of rate control, the bit rate and buffer status of the base layer are taken into consideration to avoid buffer overflow in the base layer. For example, if the base layer consumes a high number of bits relative to the target bit rate of the base layer and $R_D$ is low, then the dp_index should be increased.

An exemplary method of adjusting the number of D-frames in the enhancement layer, which can be performed by the disposable P-frame adjustment sub-component 208 (see FIG. 2b), is described herein with reference to the following pseudo code example:

| | |
|---|---|
| "$Ratio_{el\_2\_bl}$": | Ratio of bit usage in the enhancement layer versus the base layer |
| "$Ratio_{el\_2\_bl\_target}$": | Target ratio of bit usage in the enhancement layer versus the base layer | if ($dQP_{avg} > A$)
{
    if ($ratio_{el\_2\_bl} > ratio_{el\_2\_bl\_target}$)
        dp_index--;
}
else if ($dQP_{avg} < B$)

```
{
    if ((ratio_{el_2_bl} < ratio_{el_2_bl_target}) &&((R_{BL, estimated} > (K *
    R_{BL, target})) ||
(dp_index < L))
        && (QP_{avg_BL} > M))
        dp_index++;
}
``` in which A, B, K, L, and M are set to 5.0, 0.0, 0.7, 3, and 20, respectively, or any other suitable values.

In the exemplary rate control algorithm, video content analysis can be performed based at least on the quantization parameters (QPs) employed in the base and enhancement layers. As the QPs are reduced, D-frames might not be required in the enhancement layer. For example, there may be a sufficient number of bits to encode all of the video frames using P-frames within a given bit budget for the base layer. In such a case, the exemplary rate control algorithm disclosed herein can reduce the maximum target bit rate, causing the bit rate of the enhancement layer to be lower because the minimum target bit rate is fixed. Such an adjustment of the maximum target bit rate can reduce the dp_index and generate more video frames in the base layer, thereby improving the temporal quality of the base layer bitstream, without degrading video quality of the enhancement layer bitstream.

An exemplary method of adjusting the maximum target bit rate, which can be performed by the maximum target bit rate adjustment sub-component 210 (see FIG. 2b), is described herein with reference to the following pseudo code example:

```
"R_{target_max_adjusted}":  Maximum target bit rate after adjustment
if ((QP_{avg_BL} < P) && ((QP_{avg_EL} < Q) && (dp_index > 0)))
{
    R_{target_max_adjusted} *= α;
    R_{EL, target} = R_{target_max_adjusted} - R_{target_min};
}
else if ((QP_{avg_BL} > R) && ( (QP_{avg_EL} > S) || (dp_index == 0)))
{
    R_{target_max_adjusted} *= β;
    R_{EL, target} = R_{target_max_adjusted} - R_{target_min};
}
``` in which P, Q, R, S, α, and β are set to 20, 22, 22, 24, 0.96 and 1.05, respectively, or any other suitable values.

In the exemplary rate control algorithm, scene changes are also taken into consideration to increase the stability of rate control. In one exemplary embodiment, upon detection of a scene change, the quantization parameter (QP) employed in the base layer is used to encode the first D-frame in the enhancement layer, thereby making the rate control more stable after the scene change. An exemplary method of adjusting the QP employed in the enhancement layer upon detection of a scene change, which can be performed by the second QP adjustment sub-component 212 (see FIG. 2b), is described herein with reference to the following pseudo code example:

```
if (first D-frame after scene change)
{
    QP_{frame} = QP_{avg_BL}
}
else if (P or I-frames)
{
    Determine QP_{avg_BL}, dQP_{avg}, and dp_index
}
else if (D-frames)
{
    QP_{frame} = QP_{avg_BL} + dQP_{avg}
}
```

Figure 4:
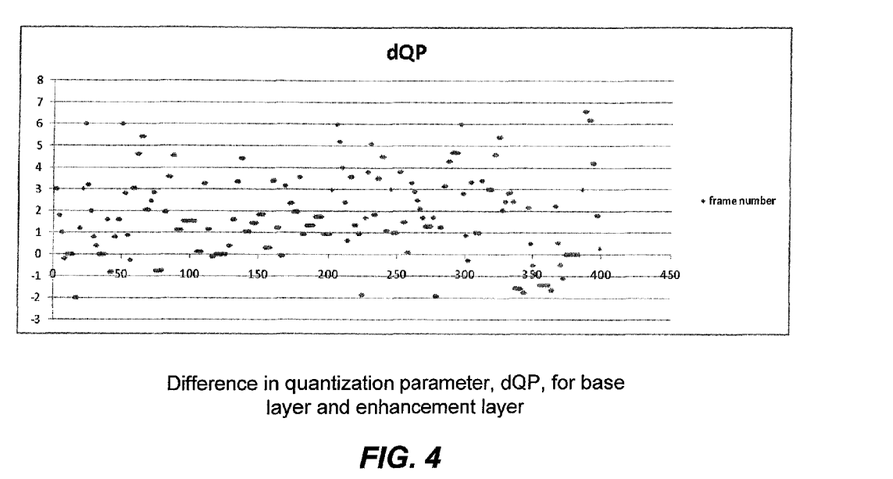
FIG. 4 is a graph illustrating dynamic changes in difference in quantization parameters between exemplary base and enhancement layers.
Figure 5:
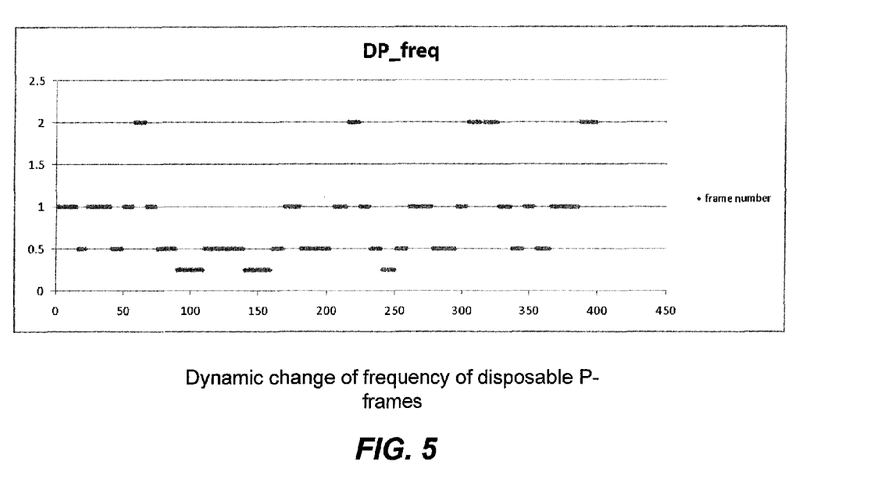
FIG. 5 is a graph illustrating the dynamic change of frequency of disposable non-reference, predictive frames.
Figure 6:
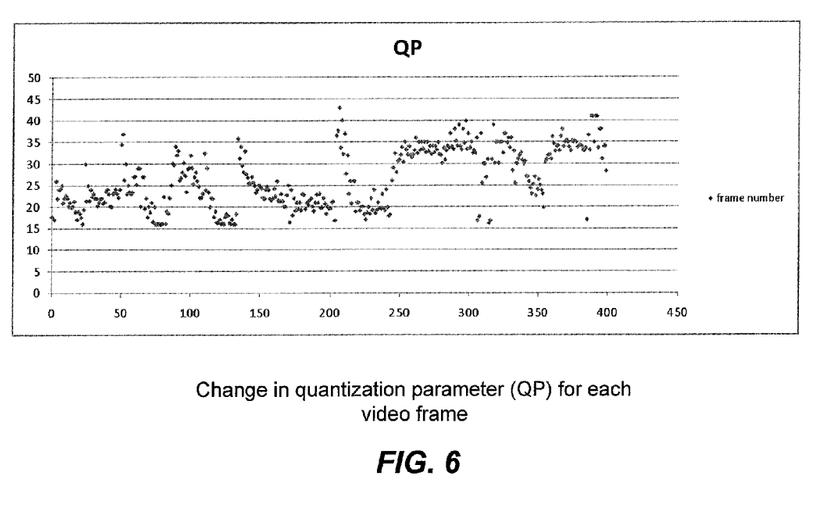
FIG. 6 is a graph illustrating dynamic changes in quantization parameters for video frames in an exemplary scalable video bitstream.

Representative results from using the exemplary rate control algorithm to perform rate control on a scalable video bitstream in a multi-layer video format are disclosed herein with reference to Table I and FIGS. 4-6. In generating these representative results, a video sequence decoded from an exemplary high profile H.264 bitstream at about 727 kbps for an 848×480 video with adaptive bi-directionally predictive, inter-coded types of video frames (also referred to herein as the "B-frames") is provided as input to the scalable video encoder 202 (see FIG. 2a). It is noted that this exemplary video contains motion as well as scene changes.

Table I provides a comparison of the maximum ("max") target bit rate, the minimum ("min") target bit rate, the base layer ("BL") plus the enhancement layer ("EL") output bit rate, and the BL output bit rate using a conventional video encoder ("Normal encoding") and the disclosed scalable video encoder 202 ("Scalable encoding"). With reference to Table I, the exemplary video is divided into four sections, and, in each section, the maximum target bit rate and the minimum target bit rate change dynamically.

TABLE I

| Duration (sec) | max target bitrate | min target bitrate | BL + EL Output bitrate | BL Output bitrate |
|---|---|---|---|---|
| Normal encoding | | | | |
| 13.29987 | 1,200,000 | N/A | 1,282,866 | 1,282,866 |
| 13.29987 | 960,000 | N/A | 985,736 | 985,736 |
| 13.29987 | 750,000 | N/A | 745,369 | 745,369 |
| 9.633237 | 960,000 | N/A | 661,522 | 661,522 |
| Scalable encoding | | | | |
| 13.29987 | 1,200,000 | 800,000 | 1,232,736 | 878,531 |
| 13.29987 | 960,000 | 800,000 | 982,639 | 808,660 |
| 13.29987 | 750,000 | 500,000 | 746,334 | 526,598 |
| 9.633237 | 960,000 | 640,000 | 652,343 | 441,465 |

FIG. 4 is a graph illustrating the change in difference of quantization parameters (such difference of quantization parameters also referred to herein as "dQP") between the respective base and enhancement layers. FIG. 5 is a graph illustrating the dynamic change of frequency of D-frames. FIG. 6 is a graph illustrating the change in the quantization parameter (QP) for each video frame of the exemplary video.

As demonstrated by the representative results illustrated in Table I and FIGS. 4-6, the exemplary rate control algorithm substantially meets the minimum target bit rate in each section of the exemplary video. Further, there is substantially no bias or fluctuation in the graph of dQP (see FIG. 4). The target number of D-frames, $R_D$ (see FIG. 5), also matches well with the flow of dQP (see FIG. 4) and QP (see FIG. 6).

Using the exemplary rate control algorithm disclosed herein, temporal scalability can be provided in a video conferencing system, an announcement server, and/or a video streaming server, by dynamically dropping disposable P-frames in the enhancement layer of video bitstreams to meet the different target bit rates of multiple participant devices. The exemplary rate control algorithm provides improved temporal quality for the base layer of the video bitstreams by adaptively adjusting the number of disposable P-frames, as well as the quantization parameters (QPs), depending on the video content and/or the target bit rate. As a result, improved spatial-temporal video quality can be achieved in the respective base and enhancement layers. It is noted that the exemplary rate control algorithm can be employed in any other suitable video encoding system that supports the use of non-reference P-frames.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A method of performing rate control in a media server that includes a scalable video encoder, the media server being communicably coupleable to at least one user device over at least one network, comprising:
   receiving, at the media server, a source video sequence over the at least one network;
   generating a scalable video bitstream from the source video sequence that includes a plurality of video frames, the scalable video bitstream including a base layer and an enhancement layer, the base layer including a first number of the plurality of video frames encoded as reference video frames, the enhancement layer including a second number of the plurality of video frames encoded as non-reference, predictive video frames, the base layer and the enhancement layer each having an associated target bit rate, the base layer having an associated current bit usage;
   determining a target bit rate range defined by a maximum bit rate and a minimum bit rate, the minimum bit rate corresponding to the target bit rate of the base layer, a difference between the maximum bit rate and the minimum bit rate corresponding to the target bit rate of the enhancement layer;
   determining, based at least on the current bit usage of the base layer, whether the first number of the plurality of video frames in the base layer can be increased to improve a temporal video quality of the base layer at a predetermined spatial video quality level;
   having determined that the first number of the plurality of video frames in the base layer can be increased:
      reducing the second number of the plurality of video frames in the enhancement layer, the reducing of the second number of the plurality of video frames including reducing the target bit rate of the enhancement layer by reducing the maximum bit rate; and
      having reduced the second number of the plurality of video frames in the enhancement layer, increasing the first number of the plurality of video frames in the base layer while maintaining the target bit rate of the base layer at the minimum bit rate; and
   transmitting, over the at least one network, the scalable video bitstream including the base layer and the enhancement layer to the at least one user device while meeting the target bit rate range.

2. The method of claim 1 further comprising:
   adjusting a quantization parameter for the second number of the plurality of video frames encoded as non-reference, predictive video frames in the enhancement layer to increase accuracy of the rate control in the scalable video encoder.

3. The method of claim 1 wherein the generating of the scalable video bitstream includes generating the scalable video bitstream with at least one non-reference, predictive video frame in the enhancement layer disposed between successive ones of the plurality of reference video frames in the base layer.

4. The method of claim 3 further comprising:
   setting, to a predetermined maximum value, a number of the at least one non-reference, predictive video frames disposed between the successive ones of the plurality of reference video frames.

5. The method of claim 1 wherein the generating of the scalable video bitstream includes generating the scalable video bitstream with at least one non-reference, predictive video frame in the enhancement layer disposed between successive groups of two or more of the plurality of reference video frames in the base layer.

6. The method of claim 5 further comprising:
   setting, to a predetermined maximum value, a number of the at least one non-reference, predictive video frames between the successive groups of two or more of the plurality of reference video frames.

7. The method of claim 1 further comprising:
   determining whether a current video frame in the source video sequence is indicative of a scene change; and
   in the event the current video frame in the source video sequence is indicative of a scene change, encoding the current video frame as one of an intra-coded type of video frame, and a reference predictive video frame.

8. The method of claim 1 further comprising:
   performing video content analysis based at least on a first quantization parameter for the first number of the plurality of video frames encoded as reference video frames in the base layer, and a second quantization parameter for the second number of the plurality of video frames encoded as non-reference, predictive video frames in the enhancement layer.

9. The method of claim 8 wherein the performing of the video content analysis includes obtaining the first quantization parameter, and obtaining the second quantization parameter, wherein the first quantization parameter is less than the second quantization parameter.

10. The method of claim 1 further comprising:
    obtaining one or more first quantization parameters for the first number of the plurality of video frames encoded as reference video frames in the base layer;
    obtaining one or more second quantization parameters for the second number of the plurality of video frames encoded as non-reference, predictive video frames in the enhancement layer; and
    dynamically adjusting one or more differences between the respective first quantization parameters and the respective second quantization parameters based at least on a current bit usage in the enhancement layer.

11. The method of claim 10 further comprising:
    obtaining a first average of the dynamically adjusted differences between the respective first quantization parameters and the respective second quantization parameters.

12. The method of claim 11 further comprising:
    obtaining a second average of the first quantization parameters for the first number of the plurality of video frames encoded as reference video frames in the base layer, wherein the obtaining of the one or more second quantization parameters for the second number of the plurality of video frames encoded as non-reference, predictive video frames in the enhancement layer includes adding the first average of the dynamically adjusted differences between the respective first quantization parameters and the respective second quantization parameters to the second average of the first quantization parameters for the first number of the plurality of video frames encoded as reference video frames in the base layer.

13. The method of claim 11 wherein at least one non-reference, predictive video frame in the enhancement layer is disposed between successive ones of the reference video frames in the base layer, and wherein the method further comprises:
adjusting a number of the non-reference, predictive video frames disposed between the successive ones of the reference video frames based at least on the first average of the dynamically adjusted differences between the respective first quantization parameters and the respective second quantization parameters.

14. The method of claim 1 further comprising:
determining whether a current video frame in the source video sequence is indicative of a scene change, and
in the event the current video frame in the source video sequence is determined to be indicative of a scene change, encoding a first non-reference, predictive video frame in the enhancement layer using a predetermined quantization parameter used for encoding one or more of the plurality of reference video frames in the base layer.

15. A system for performing rate control, comprising:
a media server operative:
to receive a source video sequence over at least one network;
to generate a scalable video bitstream from the source video sequence that includes a plurality of video frames, the scalable video bitstream including a base layer and at least one enhancement layer, the base layer including a first number of the plurality of video frames encoded as reference video frames, the enhancement layer including a second number of the plurality of video frames encoded as non-reference, predictive video frames, the base layer and the enhancement layer each having an associated target bit rate, the base layer having an associated current bit usage;
to determine a target bit rate range defined by a maximum bit rate and a minimum bit rate, the minimum bit rate corresponding to the target bit rate of the base layer, a difference between the maximum bit rate and the minimum bit rate corresponding to the target bit rate of the enhancement layer;
to determine, based at least on the current bit usage of the base layer, whether the first number of the plurality of video frames in the base layer can be increased to improve a temporal video quality of the base layer at a predetermined spatial video quality level;
having determined that the first number of the plurality of video frames in the base layer can be increased:
to reduce the second number of the plurality of video frames in the enhancement layer;
to reduce the target bit rate of the enhancement layer by reducing the maximum bit rate; and
having reduced the second number of the plurality of video frames in the enhancement layer, to increase the first number of the plurality of video frames in the base layer while maintaining the target bit rate of the base layer at the minimum bit rate; and
to transmit, over the at least one network, the scalable video bitstream including the base layer and the enhancement layer to the at least one user device while meeting the target bit rate range.

16. A method of performing rate control in a media server that includes a scalable video encoder, the media server being communicably coupleable to at least one user device over at least one network, comprising:
receiving, at the media server, a source video sequence over the at least one network;
generating a scalable video bitstream from the source video sequence that includes a plurality of video frames, the scalable video bitstream including a base layer and an enhancement layer, the base layer including a first number of the plurality of video frames encoded as reference video frames, the enhancement layer including a second number of the plurality of video frames encoded as non-reference, predictive video frames, the base layer and the enhancement layer each having an associated target bit rate, the base layer having an associated current bit usage and an associated current buffer status;
determining the current buffer status of the base layer based at least on the current bit usage of the base layer relative to the target bit rate of the base layer;
determining a target bit rate range defined by a maximum bit rate and a minimum bit rate, the minimum bit rate corresponding to the target bit rate of the base layer, a difference between the maximum bit rate and the minimum bit rate corresponding to the target bit rate of the enhancement layer;
determining, based at least on the current buffer status of the base layer, whether the first number of the plurality of video frames in the base layer can be increased to improve a temporal video quality of the base layer at a predetermined spatial video quality level;
having determined that the first number of the plurality of video frames in the base layer can be increased:
reducing the second number of the plurality of video frames in the enhancement layer, the reducing of the second number of the plurality of video frames including reducing the target bit rate of the enhancement layer by reducing the maximum bit rate; and
having reduced the second number of the plurality of video frames in the enhancement layer, increasing the first number of the plurality of video frames in the base layer while maintaining the target bit rate of the base layer at the minimum bit rate; and
transmitting, over the at least one network, the scalable video bitstream including the base layer and the enhancement layer to the at least one user device while meeting the target bit rate range.

17. The method of claim 16 wherein the adjusting of the second number of the plurality of video frames encoded as non-reference, predictive video frames in the enhancement layer includes, in the event the current bit usage in the base layer is high relative to the target bit rate of the base layer, increasing the second number of the plurality of video frames encoded as non-reference, predictive video frames in the enhancement layer.

18. The method of claim 1 wherein the increasing of the first number of the plurality of video frames in the base layer includes increasing the first number of the plurality of video frames in the base layer while maintaining the target bit rate of the base layer at the minimum bit rate, and wherein the minimum bit rate is a fixed bit rate.

19. The system of claim 15 wherein the media server is further operative, having reduced the second number of the plurality of video frames in the enhancement layer, to increase the first number of the plurality of video frames in the base layer while maintaining the target bit rate of the base layer at the minimum bit rate, wherein the minimum bit rate is a fixed bit rate.

20. The method of claim 16 wherein the increasing of the first number of the plurality of video frames in the base layer includes increasing the first number of the plurality of video frames in the base layer while maintaining the target bit rate of the base layer at the minimum bit rate, and wherein the minimum bit rate is a fixed bit rate.

21. A method of performing rate control in a media server, the media server being communicably coupleable to at least one user device over at least one network, comprising:
receiving, at the media server, a source video sequence over the at least one network;
generating, from the source video sequence, a scalable video bitstream including a base layer and an enhancement layer, the base layer including a first plurality of video frames encoded as reference video frames, the enhancement layer including a second plurality of video frames encoded as non-reference, predictive video frames, each of the base layer and the enhancement layer having a target bit rate, the base layer having a current bit usage;
determining a target bit rate range defined by a maximum bit rate and the target bit rate of the base layer, the target bit rate of the enhancement layer corresponding a difference between the maximum bit rate and the target bit rate of the base layer;
determining, based at least on the current bit usage of the base layer, whether the first plurality of video frames can be increased to improve a temporal video quality of the base layer at a predetermined spatial video quality level;
having determined that the first plurality of video frames can be increased:
dropping one or more of the second plurality of video frames in the enhancement layer;
reducing the target bit rate of the enhancement layer; and
increasing the first plurality of video frames in the base layer; and
transmitting, over the at least one network, the scalable video bitstream to the at least one user device while meeting the target bit rate range.

22. The method of claim 21 wherein the reducing of the target bit rate of the enhancement layer includes reducing the difference between the maximum bit rate and the target bit rate of the base layer.

23. The method of claim 22 wherein the target bit rate of the base layer is a fixed bit rate, and wherein the increasing of the first plurality of video frames in the base layer includes increasing the first plurality of video frames in the base layer while maintaining the target bit rate of the base layer at the fixed bit rate.

* * * * *